(12) United States Patent
Tu et al.

(10) Patent No.: US 9,535,668 B2
(45) Date of Patent: Jan. 3, 2017

(54) METHOD, DEVICE, AND STORAGE MEDIUM FOR SETTING UP APPLICATION RUNTIME ENVIRONMENT

(71) Applicant: TENCENT TECHNOLOGY (SHENZHEN) COMPANY LIMITED, Shenzhen, Guangdong Province (CN)

(72) Inventors: Qiang Tu, Shenzhen (CN); Wei Zhou, Shenzhen (CN); Wei-Yi Zeng, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 142 days.

(21) Appl. No.: 14/324,121

(22) Filed: Jul. 4, 2014

(65) Prior Publication Data

US 2014/0325473 A1      Oct. 30, 2014

Related U.S. Application Data

(63) Continuation of application No. PCT/CN2012/086831, filed on Dec. 18, 2012.

(30) Foreign Application Priority Data

Jan. 4, 2012   (CN) .......................... 2012 1 0000977

(51) Int. Cl.
*G06F 9/44*    (2006.01)
*G06F 9/48*    (2006.01)
*G06F 9/54*    (2006.01)

(52) U.S. Cl.
CPC . *G06F 8/34* (2013.01); *G06F 8/20* (2013.01); *G06F 8/30* (2013.01); *G06F 9/4843* (2013.01); *G06F 9/54* (2013.01)

(58) Field of Classification Search
None
See application file for complete search history.

(56) References Cited

U.S. PATENT DOCUMENTS

| | | | | |
|---|---|---|---|---|
| 8,024,712 B1 * | 9/2011 | Korolev | .............. | G06F 11/3476 717/127 |
| 8,589,140 B1 * | 11/2013 | Poulin | ................. | G06F 11/3457 463/42 |
| 2004/0250238 A1 * | 12/2004 | Singh | ........................ | G06F 8/30 717/108 |
| 2006/0167880 A1 * | 7/2006 | Meijer | ...................... | G06F 8/30 |

(Continued)

FOREIGN PATENT DOCUMENTS

| | | |
|---|---|---|
| CN | 1629803 A | 6/2005 |
| CN | 101360068 A | 2/2009 |

(Continued)

*Primary Examiner* — Lewis A Bullock, Jr.
*Assistant Examiner* — Mark Gooray
(74) *Attorney, Agent, or Firm* — Cheng-Ju Chiang

(57) ABSTRACT

A method, device and computer-readable storage medium for setting up runtime environment for an application are provided in the present disclosure. The method includes the following steps: determining whether the application is installed; when the application is determined being installed, creating a process of the application according to user's instruction; and providing an application platform interface for developing the application.

15 Claims, 6 Drawing Sheets

(56) References Cited

U.S. PATENT DOCUMENTS

| | | | |
|---|---|---|---|
| 2007/0277109 A1* | 11/2007 | Chen | G06F 8/20 715/733 |
| 2008/0086482 A1* | 4/2008 | Weissman | G06F 21/6218 |
| 2009/0313004 A1* | 12/2009 | Levi | G06F 8/30 703/28 |
| 2010/0211638 A1* | 8/2010 | Rougier | H04L 67/34 709/205 |
| 2011/0258614 A1* | 10/2011 | Tamm | G06F 11/3644 717/129 |
| 2012/0084757 A1* | 4/2012 | Tamiya | G06F 11/3656 717/124 |
| 2012/0204142 A1* | 8/2012 | Rubenstein | G06F 9/44526 717/101 |
| 2012/0330786 A1* | 12/2012 | Paleja | G06Q 30/02 705/26.41 |
| 2013/0047135 A1* | 2/2013 | Joshi | G06F 8/30 717/120 |
| 2014/0304689 A1* | 10/2014 | San Jose | G06F 8/71 717/134 |

FOREIGN PATENT DOCUMENTS

| | | |
|---|---|---|
| CN | 101378400 A | 3/2009 |
| WO | 2013/102397 A1 | 7/2013 |

\* cited by examiner

METHOD, DEVICE, AND STORAGE MEDIUM FOR SETTING UP APPLICATION RUNTIME ENVIRONMENT

CROSS-REFERENCE

The application is a U.S. continuation application under 35 U.S.C. §111 claiming priority under 35 U.S.C. §§120 and 365 to International Application No. PCT/CN2012/086831 filed on Dec. 18, 2012, which claims the priority benefit of CN patent application serial No. CN201210000977.4, titled "method and device for setting up application runtime environment" and filed on Jan. 4, 2012, the contents of which are incorporated by reference herein in their entirety for all intended purposes.

TECHNICAL FIELD

The present disclosure relates to computer technology, especially relates to a method, a device, and a storage medium for setting up runtime environment for an application.

BACKGROUND

Application platform refers to those computer softwares which provide the capability to embed third-party softwares. The application platform is a trend of client softwares now. The third-party applications are functional components developed by third-party developers, attached and run in appropriate client softwares. On one hand, these third-party applications rely on the application platform for publishing and promotion. On the other hand, these third-party applications enrich the features of the corresponding client softwares as functionally complement.

Plug-in system is commonly used in traditional client softwares. The plug-in system exposes a series of SDK (Software Development Kit) to enable third-party developers to develop Dynamic Link Library (dll) complied with interface specification, and to integrate the binary dll to the corresponding client software. When the function of the client software need to be evoked, the pug-in system loads the binary dll, to provide functions implemented thereby.

However, in the plug-in system, loading third-party applications may lead to instability and low performance problems of the application platform. Third-party application error would cause crash and low performance of the application platform, and the performance problem caused by the third-party applications would stay in the application platform even after the third-party applications being uninstalled. In addition, the development of the third-party applications relies on the version of application platform. For the application platform, loading expired third-party application may lead to crash. The reference count of third-party applications is easily go wrong, which may cause the application cannot be uninstalled or the application platform crash after uninstalling the third-party application. Furthermore, updating the third-party application usually has to restart the client software.

SUMMARY OF THE INVENTION

Therefore, there provides a stable method and device for setting up runtime environment for an application.

In accordance with one embodiment, a method for setting up runtime environment for an application, may include: determining whether the application is installed; when the application is determined being installed, creating a process of the application according to user's instruction; and providing an application platform interface for developing the application.

In accordance with another embodiment, a device for controlling an electronic map, the device comprises at least a processor operating in conjunction with a memory and a plurality of modules. The plurality of modules include: a determining module, configured to determine whether the application is installed; a process creating module, when the application is determined being installed, configured to create a process of the application according to user's instructions; an interface opening module, configured to provide an application platform interface for developing the application.

In accordance with yet another embodiment, a computer-readable storage medium storing instructions for setting up runtime environment for an application by an application platform, the instructions may include: determining whether the application is installed; when the application is determined being installed, creating a process of the application according to user's instruction; and providing an application platform interface for developing the application.

In accordance with the embodiments of the present disclosure, one to multiple cross process structure may set up between the application platform and the process of the application to solve the instability and low performance problems caused by loading third-party application in prior art. In the mean time, after management relationship between the application center of the application platform and the process of the application by the connecting session therebetween, the application platform provides the application platform unified interface for developing the application according to the management relationship, therefore the expansibility of the application platform is improved.

DETAILED DESCRIPTION OF PREFERRED EMBODIMENTS

Various embodiments of the disclosure are discussed in detail below. While specific implementations are discussed, it should be understood that this is done for illustration purposes only. A person skilled in the art will recognize that other components and configurations may be used without parting from the spirit and scope of the disclosure.

The embodiments discussed below relate generally to set up application runtime environment in a computing system.

An exemplary computing system for an electronic device may include a processor, a storage medium, a monitor, a communication module, a database, peripherals, and one or more bus to couple the devices together. Certain devices may be omitted and other devices may be included.

The mentioned electronic devices in the present disclosure, such as desktop computers, notebook computers, smart phones, personal digital assistants, tablet PCs, etc., install/run one or more smart operating system inside. The applications are software function modules, which are installed in the smart operating system and used to accomplish certain function.

Figure 1:
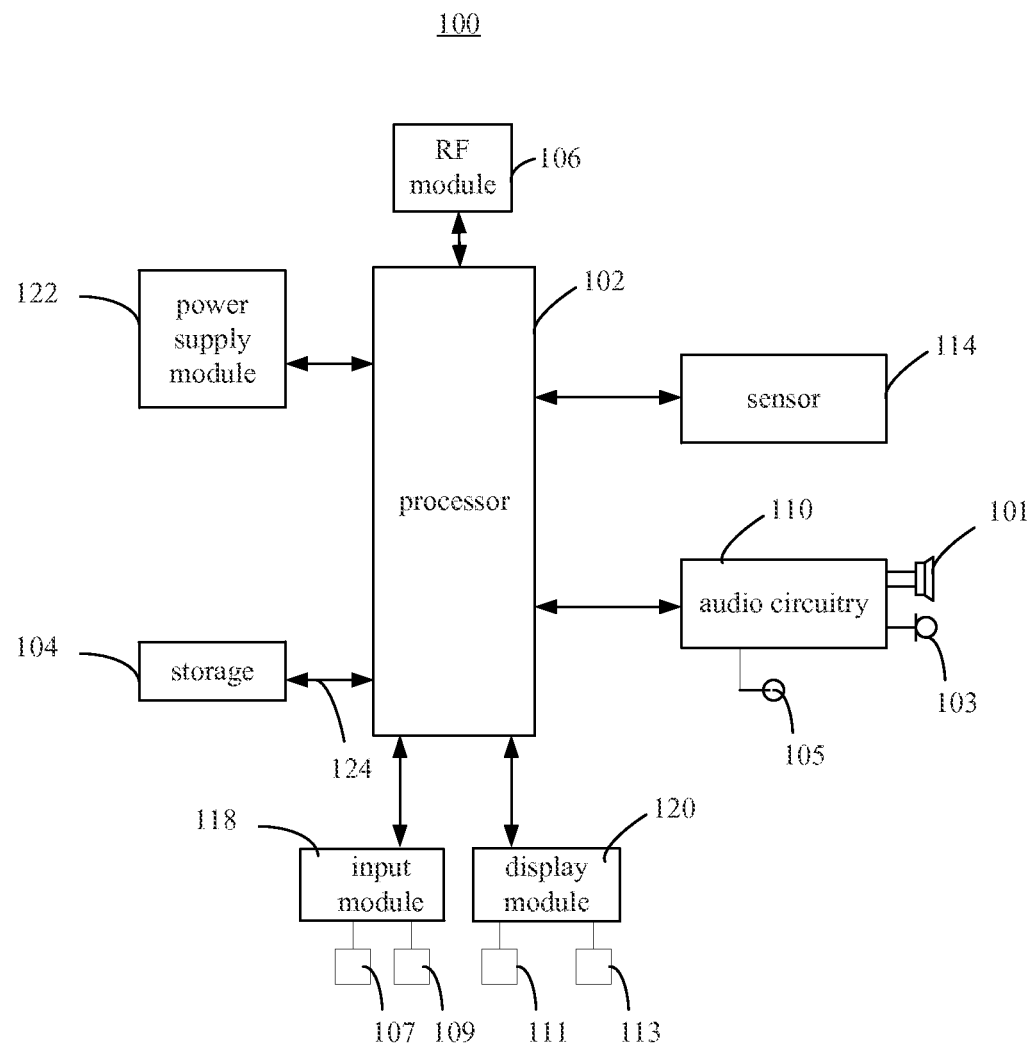
FIG. 1 is a block diagram of an embodiment of an electronic apparatus.

FIG. 1 illustrates an embodiment of an electronic apparatus in the present disclosure. Referring to FIG. 1, the electronic apparatus 100 includes one or more (only one in FIG. 1) processors 102, a storage 104, a Radio Frequency (RF) module 106, an audio circuitry 110, a sensor 114, an input module 118, a display module 120, and a power supply module 122. A person skilled in the art will understand that the structure in FIG. 1 is shown for illustration purposes only, not limitations of the electronic apparatus 100. For example, the electronic apparatus 100 may also include more or less parts than FIG. 1 shows, or different configuration.

It can be understood by those skilled in the art that besides the processor 102, all other components are belong to peripheral. The processor 102 and the peripherals are coupled by many peripheral interfaces 124. Peripheral interfaces 124 may be implemented based on the following standards: Universal Asynchronous Receiver/Transmitter (UART), General Purpose Input Output (GPIO), Serial Peripheral Interface (SPI), Inter-Integrated Circuit (I2C), but not limited to the above standards. In some examples, the peripheral interfaces 124 may only include the bus; while in other examples, the peripheral interfaces 124 may also include other components, one or more controllers, for example, which may be a display controller for connecting a liquid crystal display panel or a storage controller for connecting storage. In addition, these controllers may also be separated from the peripheral interface 124, and integrated inside the processor 102 or the corresponding peripheral.

The storage 104 may be used to store software programs and modules, such as the program instructions/modules corresponding to the method and device for setting up runtime environment for an application in the present disclosure. The processor 102 performs a variety of functions and data processing by running the software program and the module stored in the storage 104, which implements the above method for setting up runtime environment for an application in the electronic apparatus. Storage 104 may include high-speed random access memory and nonvolatile memory, such as one or more magnetic storage devices, flash memory, or other non-volatile solid-state memory. In some examples, the storage 104 may further include a remote configured memory compared to the processor 102, which may be connected to the electronic apparatus 100 via the network. The network instances include but not limited to, the Internet, intranets, local area network, mobile communication network, and their combinations.

The RF module 106 is used for receiving and transmitting electromagnetic waves, implementing the conversion between electro-magnetic waves and electronic signals, and communicating with the communication network or other devices. The RF module 106 may include a variety of existing circuit elements, which perform functions, such as antennas, RF transceivers, digital signal processors, encryption/decryption chips, the subscriber identity module (SIM) card, memory, etc. The RF module 106 can communicate with a variety of networks such as the Internet, intranets, wireless network and communicate to other devices via wireless network. The above wireless network may include a cellular telephone network, wireless local area network (LAN) or metropolitan area network (MAN). The above wireless network can use a variety of communications standards, protocols and technologies, including but not limited to Global System for Mobile Communication (GSM), Enhanced Data GSM Environment (EDGE), wideband code division multiple access (W-CDMA), Code division access (CDMA), time division multiple access (TDMA), Wireless, Fidelity (Wi-Fi) (such as the American Institute of Electrical and Electronics Engineers Association standards IEEE 802.11a, IEEE 802.11b, IEEE802.11g, and/or IEEE 802.11n), Voice over internet protocol (VoIP), Worldwide Interoperability for Microwave Access (Wi-Max), other protocols used for mail, instant messaging and short message, as well as any other suitable communication protocol, even including the protocols which are not yet been developed currently.

The audio circuitry 110, the speaker 101, the audio jack 103, the microphone 105 together provide the audio interface between the user and the electronic device 100. Specifically, the audio circuit 110 receives audio data from the processor 102, converts the audio data into an electrical signal, and transmits the signal to the speaker 101. The speaker 101 converts the electrical signals to sound waves which can be heard by human ears. The audio circuitry 110 also receives electronic signals from the microphone, converts electronic signals to audio data, and transmits the audio data to the processor 102 for further processing. The audio data may also be obtained from the storage 104 or the RF module 106, the transmission module 108. In addition, the audio data may also be stored in the storage 104 or transmitted by the RF module 106 and the transmission module 108.

Examples of the sensor 114 include but not limited to: an optical sensor, an operating sensor, and other sensors. Specifically, the optical sensor may include an ambient light sensor and a proximity sensor. The ambient light sensor may sense ambient light and shade, and then some modules executed by the processor 102 may use the output of the ambient light sensor to automatically adjust the display output. The proximity sensor may turn off the display output when detect the electronic device 100 near the ear. As a kind of motion sensor, gravity sensor may detect the value of acceleration in each direction (typically triaxiality), and the value and direction of gravity when the gravity sensor keeps still, which can be used for applications to identify the phone posture (such as horizontal and vertical screen switching, related games, magnetometer posture calibration), and for vibration recognition related functions (such as pedometer, percussion), etc. The electronic device 100 may also include a gyroscope, a barometer, a hygrometer, a thermometer, and other sensors, which is not shown for the purpose of brevity.

The input unit 118 may be configured to receive the input character information, and to generate input by keyboard, mouse, joy-stick, optical or trackball signal related to user settings and function control. Specifically, the input unit 130 may include button 107 and touch surface 109. The buttons 107 for example, may include character buttons for inputting characters, and control buttons for triggering control function. The instances of the control buttons may include a "back to the main screen" button, a power on/off button, a camera button, and so on. The touch surface 109 may collect user operation on or near it (for example, a user uses a finger, a stylus, and any other suitable object or attachment to operate on or near the touch surface 109), and drive the corresponding connecting device according to pre-defined program. Optionally, the touch surface 109 may include a touch detection device and a touch controller. The touch detection device detects users' touch position and a signal produced by the touch operation, and passes the signal to the touch controller. The touch controller receives touch information from the touch detection device, converts the touch information into contact coordinates, sends the contact coordinates to the processor 102, and receives and executes commands sent from the processor 102. In addition, the touch surface 109 may be implemented in resistive, capacitive, infrared, surface acoustic wave and other forms. Besides the touch surface 109, the input unit 118 may also include other input devices. The preceding other input devices include but not limited to, one or more physical keyboards, trackballs, mouse, joysticks, etc.

The display module 120 is configured to display the information input by users, the information provided to users, and a variety of graphical user interfaces of the electronic device 100. The graphical user interfaces may consist of graphics, text, icons, video, and any combination of them. In one example, the display module 120 includes a display panel 111. The display panel 111 may for example be a Liquid Crystal Display (LCD) panel, an Organic Light-Emitting Diode Display (OLED) panel, an Electro-Phoretic Display (EPD) panel and so on. Furthermore, the touch surface 109 may be on top of the display panel 111 as a whole. In other embodiments, the display module 120 may also include other types of display devices, such as a projection display device 113. Compared with the general display panel, the projection display device 113 needs to include a plurality of components for projection, such as a lens group.

The power supply module 122 is used to provide power for the processor 102 and other components. Specifically, the power supply module 122 may include a power management system, one or more power supplies (such as a battery or AC), a charging circuit, a power failure detection circuit, an inverter, a power status indicator, and any other components related to electricity generation, management and distribution within the electronic device 100.

Figure 2:
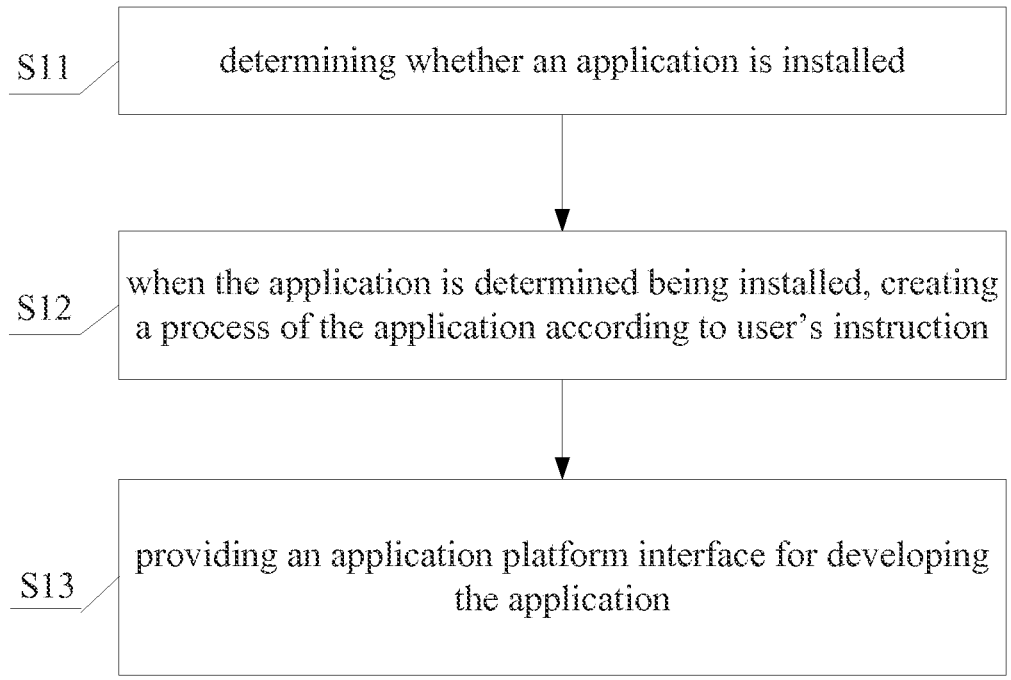
FIG. 2 is a flow chart of a method for setting up runtime environment for an application provided by one embodiment of the present disclosure.

In the conventional computing systems, applications are run in a runtime environment based on an application platform to realize corresponding functions. The application, referring to computer software implemented to complement the application platform's function, is generally developed by a third-party developer. The runtime environment is a general designation including data, interface and running status during the running process of the computer software. However, when running in the runtime environment based on the application platform, the application often relies on the performance of the application platform, which may lead to instability and low performance problems, and the compatibility and expansibility of the application cannot be guaranteed by the application platform. To solve above problem, the embodiments of the present disclosure may provide new a method for setting up runtime environment for an application. In the following detail discussion of the embodiments, Instant Messenger (IM) software (QQ, for example) is chosen as an exemplary application platform. With reference to FIG. 2, a method for setting up runtime environment for an application in an electronic apparatus provided by one embodiment of the present disclosure includes the following steps:

In Step 11, the application platform determines whether the application is installed.

Specifically, the application platform, an Instant Messenger software in the exemplary embodiment, may determine status of the application by detecting whether a file having a predefined format exists in a predetermined path. The status of the application may include installation of the application and un-installation of the application.

In detail, the Instant Messenger software may predefine a predetermined path, for example % appdata %/XX/TxApp/, and detect whether the file having the predefined format exists in the TxApp folder, while the Instant Messenger software is running Wherein, the "XX" is a name of a folder where the Instant Messenger (IM) software exists, like "QQ".

The file having the predefined format in the folder may carry information of the application, such as ID of the application (application ID), name of the application, and version of the application, etc.

For example, the file may be an appinfo xml file having the predefined format. The predefined format of the appinfo xml file may include:

```
<ArkApp>
    < app_id>100001</ app_id>          <!—Application ID -->
    < app_text>note</app_text>         <!—Application name -->
    < app_ver>1.0</ app_ver>           <!—Application version-->
</ArkApp>
```

If the appinfo.xml file having the predefined format is found in the TxApp folder, it means the application has been installed. Correspondingly, if the appinfo.xml file having the predefined format is deleted, it means the application has been uninstalled.

Therefore, the Instant Messenger software may determine whether the application is installed by detecting whether the file having the predefined format exists in the predetermined path. In the above example, when the appinfo.xml file is created in the TxApp folder, the Instant Messenger software may determine the application is installed. When the appinfo.xml file or the folder containing the appinfo.xml file is deleted, the Instant Messenger software may determine the application is uninstalled. The Instant Messenger software also may obtain other status of the application according to the file having the predefined format. For example, when the folder containing the appinfo.xml file is modified, the Instant Messenger software may determine the application is modified.

It should be noted that, above mentioned path % appdata%/XX/TxApp/ and the appinfo.xml file are specific examples only, embodiments of the present invention is not limited thereto.

In Step 12, when the application is determined being installed in Step 11, the application platform creates a process of the application (App process) according to user's instructions.

In detail, when the Instant Messenger software determines the application is installed, the Instant Messenger software may notify the users. The users may send instructions to the Instant Messenger software. The Instant Messenger software may create an application's process of the application at the time of receiving user's instructions. For example, the Instant Messenger software may create the process of the application at the time of receiving a wake up command send by the users.

Figure 3:
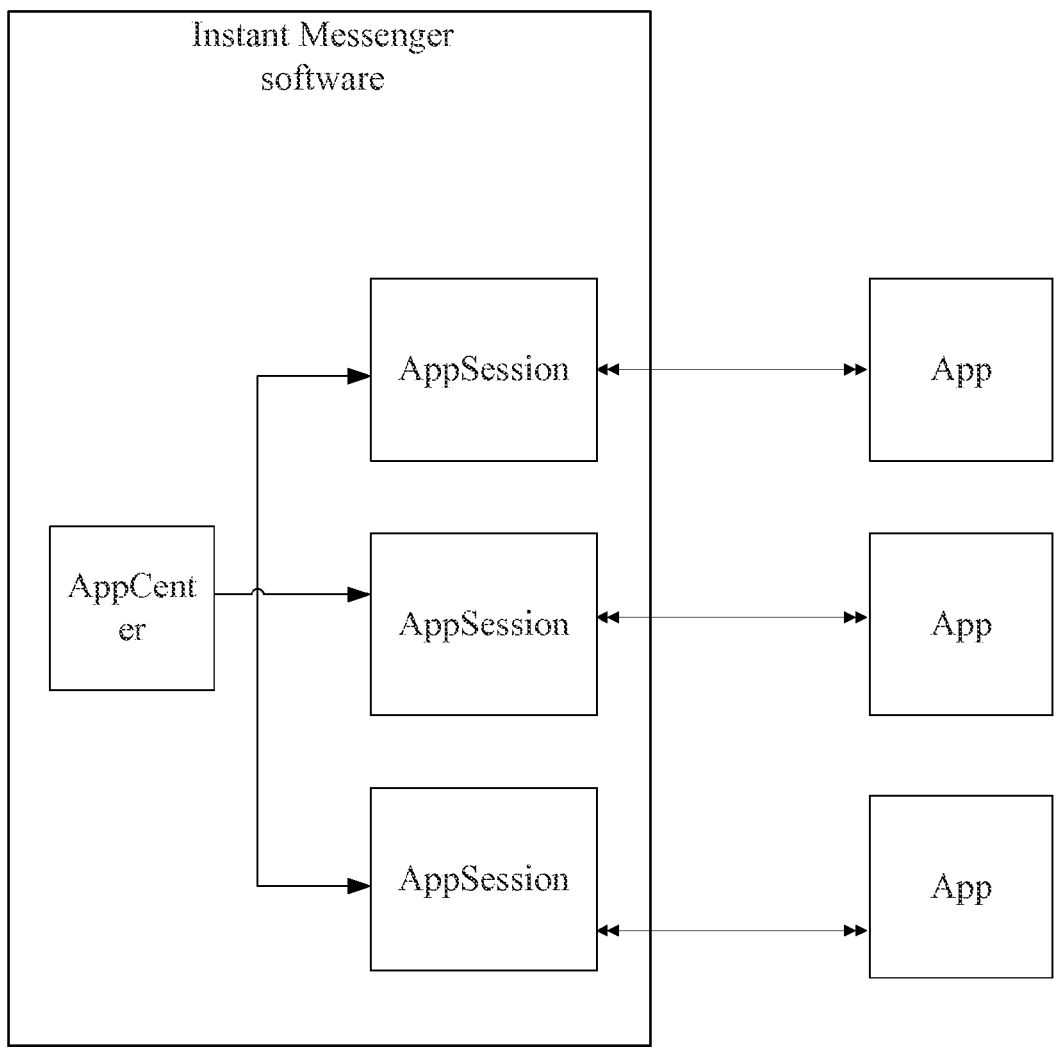
FIG. 3 illustrates a target structure for creating the application provided by one embodiment of the present disclosure.

Referring to FIG. 3, each application runs in an independent process is a target for creating the process of the application. The Instant Messenger software may include an application center (App Center). After creating the process of the application, a management relationship between the application center of the Instant Messenger software and the process of the application is set up by a corresponding connecting session (App session) therebetween. The application center of the Instant Messenger software and the App session corresponding to e a corresponding connecting session ach App process may manage the App process together.

Figure 4:
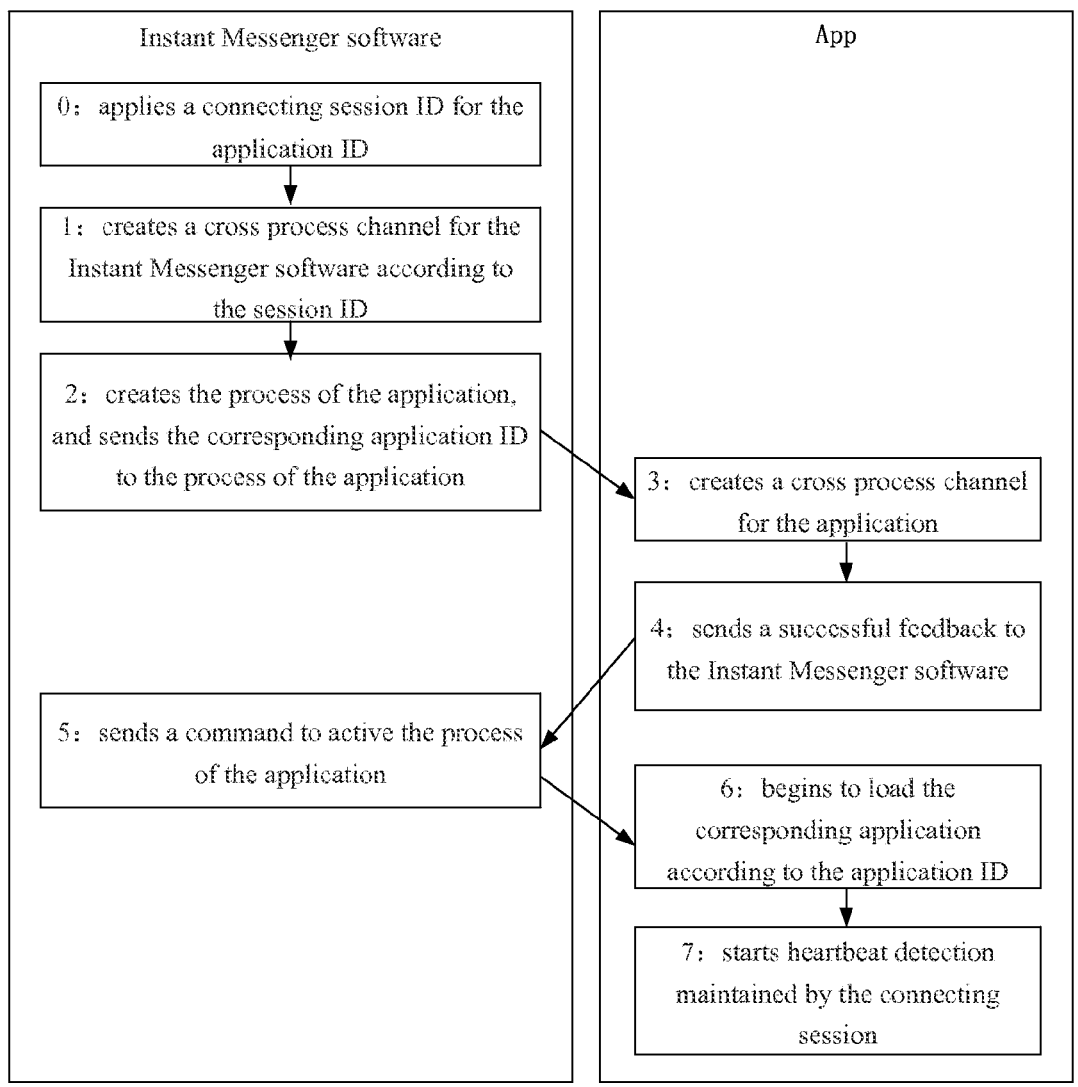
FIG. 4 illustrates a process of creating a process of an application provided by one embodiment of the present disclosure.

The detail process of creating the process of the application is illustrated in FIG. 4. Referring to FIG. 4, in order to create the process of the application, a process of the Instant Messenger software applies a connecting session ID (App session ID) for each application ID, creates a cross process channel for the Instant Messenger software according to the connecting session ID, creates the process of the application, and sends the corresponding application ID to the process of the application, for example, by a command line (commands to the program in a form of successive lines of text). The process of the application creates a cross process channel for the application and sends a successful feedback to the Instant Messenger software. After receiving the feedback, the Instant Messenger software may send a command to active the process of the application. The process of the application begins to load the corresponding application according to the application ID, and starts heartbeat detection maintained by the connecting session, and then the management relationship between the application center of the Instant Messenger software and the process of the application is set up.

In Step 13, the application platform provides an application platform interface for developing the application.

Providing an interface in the runtime environment for application developers, can make functions of the Instant Messenger software can be used by the application. The interface may be an interface of the software development kit (SDK) of the Instant Messenger software. SDK is a set of software development tools (including application programming interfaces (APIs)) that allows for the creation of applications for a certain software package, software framework, hardware platform, computer system, video game console, operating system, or similar development platform. The steps of providing unified application platform interface design may include:

1. Defining the application platform interface as:
synchronous version: local requestResult;
requrestResult=IPC. SyncGet(requestUrl);
asynchronous version: local requestResult;
IPC.AsyncGet(requestUrl, function (result) requestResult=result end)

2. Parameters of the application platform interface must comply with the grammar below:
Supplied requestUrl when calling platform service: hummer://application name//application request function?[parameter name=parameter list], for example, the requestUrl of requesting the note list of number 10000 is hummer://note/GetNoteList?uin=10000;

Result requestResult returned by platform calling: always return JSON format data, for example, the result in the last example is {"err"=user not login};

3. All of calling data and returning data delivered by the interface are entered in the channel established by Step 12 during the data transmitting process, to implement the function call to the application platform. Application developers may obtain the application platform function very quickly, by calling the uniformed application platform interface.

Furthermore, the process of calling the application platform function may include: receiving a cross process channel packet sent by the process of the application and decoding the cross process channel packet, obtaining a data processing result, a data processing result for example, packing the data processing result to generate a result package, and sending the result package to the process of the application.

Figure 5:
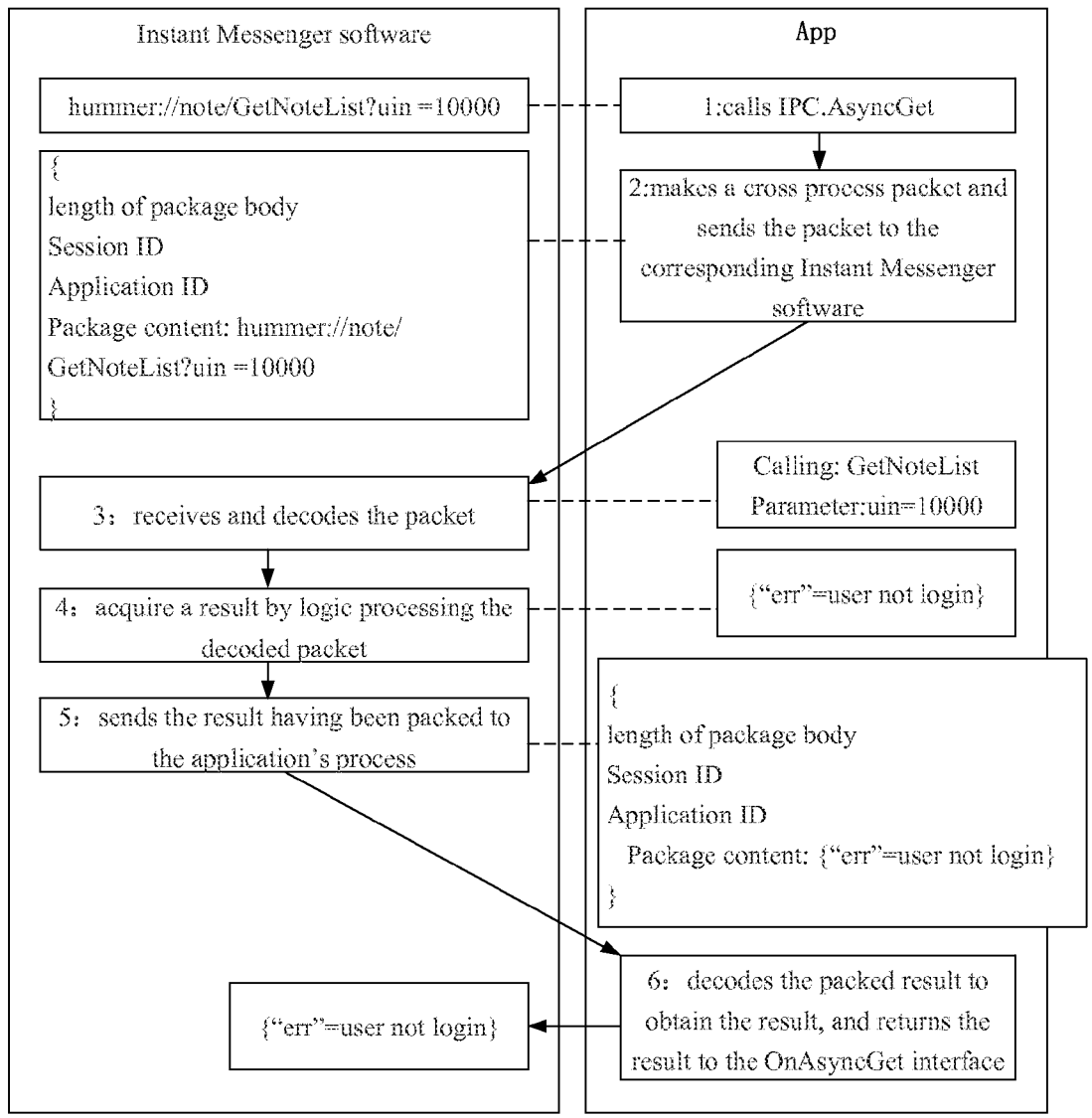
FIG. 5 illustrates a process of calling an application platform function provided by one embodiment of the present disclosure.

In detail, the process of the corresponding application developer calling the application platform function is illustrated in FIG. 5. The corresponding application developer may first call IPC.AsyncGet to generate packet contents containing 'hummer://note/GetNoteList?uin=10000', and then make a cross process channel packet in the process of the application, and send the cross process channel packet to the Instant Messenger software. The Instant Messenger software may receive and decode the cross process channel packet, obtain a data processing result (logic processing result for example), pack the data processing result to generate a result package, and send the result package to the process of the application. The corresponding process of the application may decode the packed result to obtain a result, and return the result to the OnAsyncGet interface.

Wherein, the format of corresponding cross process channel package is:

| | | |
|---|---|---|
| struct PacketData | | |
| { | | |
|    long lBodyBufferLen; | | // length of package body |
|    char* destIpcName; | | // target IPC ( Inter-Process Communication ) name |
|    char* srcIpcName; | | // source IPC name |
|    unsigned char* cBodyBuffer; | | // content of package body |
| } | | |

All of the evoked transfer parameters may in char string format, which may make the packing and de-packing process very simple and fast.

In the exemplary embodiment of the present disclosure, the application platform determined whether is application is installed. When the application is determined being installed, the application platform creates a process of the application according to user's instruction. The application platform also provides an application platform interface for developing the application. One to multiple cross process structure may set up between the application platform and the process of the application to solve the instability and low performance problems caused by loading third-party application in prior art. In the mean time, after management relationship between the application center of the application platform and the process of the application by the connecting session therebetween, the application platform provides the application platform unified interface for developing the application according to the management relationship, therefore the expansibility of the application platform is improved.

Figure 6:
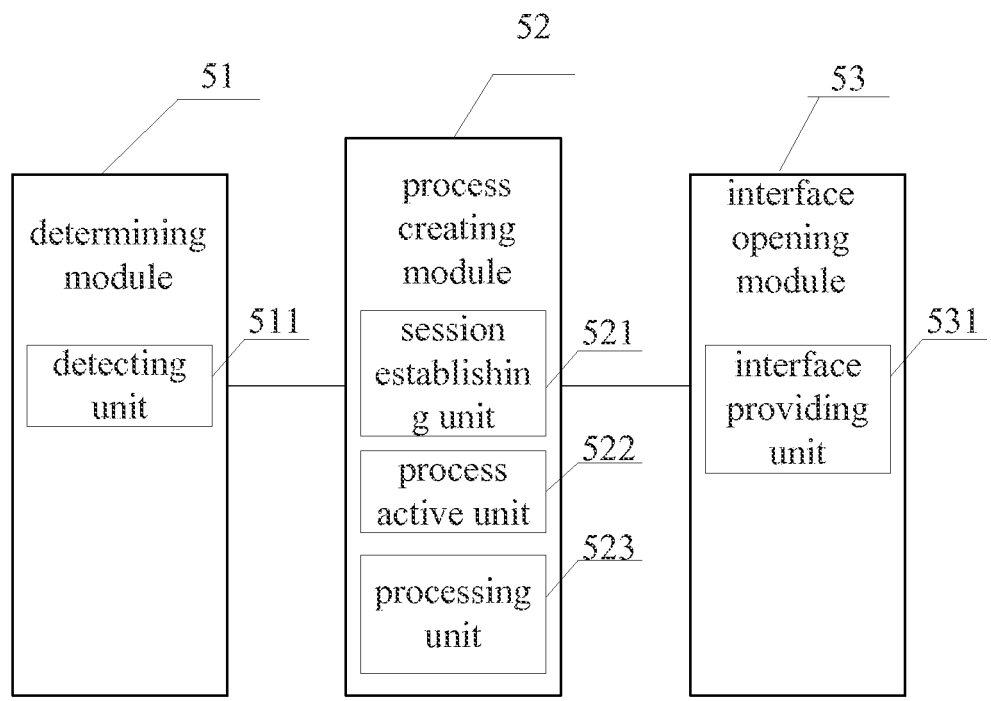
FIG. 6 is a block diagram of a device for setting up runtime environment for an application provided by an embodiment of the present disclosure.

The exemplary embodiment of the present disclosure also provides a device for setting up runtime environment for an application. Referring to FIG. 6, the device includes a determining module 51, a process creating module 52, and an interface opening module 53.

Wherein, the determining module 51 is configured to determine whether the application is installed. When the application is determined being installed, the process creating module 52 is configured to create a process of the application according to user's instructions. After creating the process of the application, a management relationship between the application center of the application platform and the process of the application is set up by a corresponding connecting session (App session) therebetween. The interface opening module 53 is configured to provide an application platform interface for developing the application.

The determining module 51 may detect whether a file having a predefined format exists in a predetermined path. The status of the application may include installation of the application and un-installation of the application.

Optionally, the determining module 51 may includes a detecting unit 511. In the process of determining the application's status, if the file having a predefined format is found in a predetermined path, the detecting unit 511 is configured to determine status of the application.

Optionally, the process creating module 52 may include a session establishing unit 521 and a process active unit 522. The session establishing unit 521 is configured to apply a connecting session ID for each application ID, create a cross process channel for the application platform according to the connecting session ID, create the process of the application and send the corresponding application ID to the process of the application, for example, by command line. The process active unit 522 is configured to send a command to active the process of the application according to a feedback indicating a cross process channel for the application is successfully created by the process of the application.

Optionally, the process creating module 52 may include a processing unit 523 configured to receive a cross process channel packet sent by the process of the application and decode the cross process channel packet, obtain a result by logic procession, and send the result having been packed to the process of the application.

Optionally, the interface opening module 53 may include an interface providing unit 531, configured to provide an application platform interface for developing the application, i.e., providing an interface of software development kit (SDK) of the application platform.

The function of each unit of the device for setting up runtime environment for an application has been described in the preceding corresponding method embodiment, will not repeat herein.

One to multiple cross process structure may set up between the application platform and the process of the application to solve the instability and low performance problems caused by loading third-party application in prior art. In the mean time, after management relationship between the application center of the application platform and the process of the application by the connecting session therebetween, the application platform provides the application platform unified interface for developing the application according to the management relationship, therefore the expansibility of the application platform is improved. What's more, various devices provided by the embodiments of the disclosure discussed above is done for illustration purposes only, and should not be taken as limitations of the general principles of the device for processing virus in electronic apparatus provided by the embodiment of the disclosure. It will be understood that various combinations and changes in the form and details of the device illustrated may be made by those skilled in the art without departing from the disclosure.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. A "tangible" computer-readable medium expressly excludes software per se (not stored on a tangible medium) and a wireless, air interface. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Program modules may also comprise any tangible computer-readable medium in connection with the various hardware computer components disclosed herein, when operating to perform a particular function based on the instructions of the program contained in the medium.

The above descriptions are only preferred embodiments of the present disclosure, and are not intended to limit the present disclosure. Any amendments, replacement and modification made to the above embodiments under the spirit and principle of the present disclosure should be included in the scope of the present disclosure.

What is claimed is:

1. A method for setting up a runtime environment for an application comprising:
   an application platform of a client software to perform the steps of:
   determining whether the application is installed;
   receiving a wake up command for the application by the user;
   in response to the wake up command and when the application is determined to be installed, creating a process of the application;
   managing the application's process, by an application center of said application platform, by creating a connecting session between said application center and said process of the application, wherein creating and managing the process of the application further comprises:
applying a connecting session identification (ID) for an ID of the application;
creating a cross process channel for the application platform according to the connecting session ID;
creating a process of the application; and
sending the ID of the application to the process of the application;
sending a command to activate and load the process of the application according to a feedback indicating the cross process channel for the application is successfully created by the process of the application; and
after activating and loading the process of the application, providing an application platform interface for developing the application, wherein said interface allows application developers to use functions of the client software with the application.

2. The method as claimed in claim 1, wherein the step of determining whether the application is installed comprises:
determining status of the application by detecting whether a file having a predefined format exists in a predetermined path.

3. The method as claimed in claim 2, wherein if the file having the predefined format is found in the predetermined path, the application is determined as being installed.

4. The method as claimed in claim 1, after the step of providing an application platform interface for developing the application, the method further comprising:
receiving a cross process channel packet sent by the process of the application and decoding the cross process channel packet, obtaining a data processing result, packing the data processing result to generate a result package, and sending the result package to the process of the application.

5. The method as claimed in claim 1, wherein, the step of providing an application platform interface for developing the application comprises:
in the process of the application, providing an interface of software development kit of the application platform for application developers.

6. A device for controlling an electronic map, the device comprises at least a processor operating in conjunction with a memory and a plurality of modules, wherein the plurality of modules comprises:
an application platform of an client software comprising:
an determining module, configured to determine whether the application is installed;
a process creating module, when the application is determined being installed and after receiving a wake up command for the application by a user, configured to create a process of the application
wherein creating the process of the application comprises, managing the application's process, by an application center of said application platform, by creating a connecting session between said application center and said process of the application, wherein creating and managing the process of the application further comprises:
applying a connecting session identification (ID) for an ID of the application;
creating a cross process channel for the application platform according to the connecting session ID;
creating a process of the application; and
sending the ID of the application to the process of the application;
sending a command to activate and load the process of the application according to a feedback indicating the cross process channel for the application is successfully created by the process of the application; and
an interface opening module, after activating and loading the process of the application, providing an application platform interface for developing the application, wherein said interface allows application developers to use functions of the client software with the application.

7. The device as claimed in claim 6, wherein the determining module is further configured to determine status of the application by detecting whether a file having a predefined format exists in a predetermined path.

8. The device as claimed in claim 7, wherein if the file having the predefined format is found in the predetermined path, the determining module determines the application is installed.

9. The device as claimed in claim 6, wherein the process creating module comprises:
a processing unit, configured to receive a cross process channel packet sent by the process of the application and decode the cross process channel packet, obtain a data processing result, pack the data processing result to generate a result package, and send the result package to the process of the application.

10. The device as claimed in claim 6, wherein, the interface opening module comprises:
an interface providing unit, configured to provide an interface of software development kit of the application platform for application developers in the process of the application.

11. A non-transitory computer-readable storage medium storing instructions for setting up runtime environment for an application, the instructions comprising:
an application platform of a client software to perform the steps of:
determining whether the application is installed;
receiving a wake up command for the application by the user;
in response to the wake UP command and when the application is determined being installed, creating a process of the application;
managing the application's process, by an application center of said application platform, by creating a connecting session between said application center and said process of the application, wherein creating and managing the process of the application further comprises:
applying a connecting session identification (ID) for an ID of the application;
creating a cross process channel for the application platform according to the connecting session ID;
creating a process of the application; and
sending the ID of the application to the process of the application;
sending a command to activate and load the process of the application according to a feedback indicating the cross process channel for the application is successfully created by the process of the application; and
after activating and loading the process of the application, providing an application platform interface for developing the application, wherein said interface allows application developers to use functions of the client software with the application.

12. The computer-readable storage medium as claimed in claim 11, wherein the step of determining whether the application is installed comprises:

determining status of the application by detecting whether a file having a predefined format exists in a predetermined path.

13. The computer-readable storage medium as claimed in claim 12, wherein if the file having the predefined format is found in the predetermined path, the application is determined as being installed.

14. The computer-readable storage medium as claimed in claim 11, after the step of providing an application platform interface for developing the application, the method further comprising:

receiving a cross process channel packet sent by the process of the application and decoding the cross process channel packet, obtaining a data processing result, packing the data processing result to generate a result package, and sending the result package to the process of the application.

15. The computer-readable storage medium as claimed in claim 11, wherein, the step of providing an application platform interface for developing the application comprises:

in the process of the application, providing an interface of software development kit of the application platform for application developers.

\* \* \* \* \*